US010918910B2

(12) United States Patent
Lutz et al.

(10) Patent No.: US 10,918,910 B2
(45) Date of Patent: Feb. 16, 2021

(54) DIGITAL ASSISTANT FOR THERAPEUTIC TREATMENT

(71) Applicant: SAP SE, Walldorf (DE)

(72) Inventors: Michael Lutz, Leimen (DE); Martina Rothley, Schwetzingen (DE)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 16/201,055

(22) Filed: Nov. 27, 2018

(65) Prior Publication Data

US 2020/0164250 A1    May 28, 2020

(51) Int. Cl.
| A63B 24/00 | (2006.01) |
| G10L 15/26 | (2006.01) |
| G10L 15/22 | (2006.01) |
| G06F 40/20 | (2020.01) |
| G06F 16/63 | (2019.01) |
| A63B 71/06 | (2006.01) |

(52) U.S. Cl.
CPC ...... *A63B 24/0075* (2013.01); *A63B 24/0087* (2013.01); *G06F 40/20* (2020.01); *G10L 15/22* (2013.01); *G10L 15/26* (2013.01); *A63B 2071/063* (2013.01); *A63B 2225/20* (2013.01); *A63B 2225/64* (2013.01); *A63B 2225/66* (2013.01); *G06F 16/63* (2019.01); *G10L 2015/223* (2013.01)

(58) Field of Classification Search
USPC ..................................................... 704/1–504
See application file for complete search history.

(56) References Cited

U.S. PATENT DOCUMENTS

| 7,461,079 | B2* | 12/2008 | Walker | G16H 15/00 |
| 8,688,459 | B2* | 4/2014 | Nenov | A61B 5/7445 |
| | | | | 704/275 |
| 8,818,810 | B2* | 8/2014 | Weng | G10L 17/24 |
| | | | | 704/246 |
| 9,576,574 | B2* | 2/2017 | van Os | G06F 3/167 |
| 10,504,622 | B2* | 12/2019 | Gallopyn | G16H 40/20 |
| 2013/0173268 | A1* | 7/2013 | Weng | G10L 17/22 |
| | | | | 704/249 |
| 2014/0365219 | A1* | 12/2014 | Weng | G10L 17/24 |
| | | | | 704/249 |
| 2018/0005645 | A1* | 1/2018 | Khaleghi | H04W 4/14 |
| 2020/0164250 | A1* | 5/2020 | Lutz | A63B 24/0087 |

* cited by examiner

*Primary Examiner* — Marcus T Riley
(74) *Attorney, Agent, or Firm* — Buckley, Maschoff & Talwalkar LLC

(57) ABSTRACT

Provided are systems and methods for implementing a digital assistant for therapeutic treatments via a transmitting device (e.g., smartphone, tablet, laptop, smart speaker, smart-wearable, etc.) In one example, the method may include one or more of receiving a speech input command from a transmitting device, converting the speech input command into text and identifying a user from among a plurality of users based on the text converted from the speech input command, determining a treatment to be performed for the identified user based on historical treatments given to the identified user stored in a database, and outputting, to the transmitting device, a speech response describing the determined treatment to be performed on the identified user.

19 Claims, 6 Drawing Sheets

DIGITAL ASSISTANT FOR THERAPEUTIC TREATMENT

BACKGROUND

In sports, the role of a physical therapist (also referred to as a physio) is to provide recurring physical treatment to athletes who suffer from aches and pains. Treatment may include a few minutes of massage for stiff muscles, cold therapy after a grueling exercise, stretching before a match, and the like. Often, a physical therapist, or a few physical therapists are assigned to work with a team including dozens of players. In this scenario, the physical therapist may perform treatment on multiple players on a regular basis (e.g., daily, weekly, etc.) After a match or a practice, for example, a physical therapist may treat a group of athletes in just a few hours of time. Because physical therapists work with their hands, stopping to write down the treatments they are applying to each person is not feasible. As a result, the treatments often go undocumented and redundant questions and answers must occur each time the physio treats the patient. Accordingly, what is needed is needed is an improved technology that helps therapists when treating patients.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
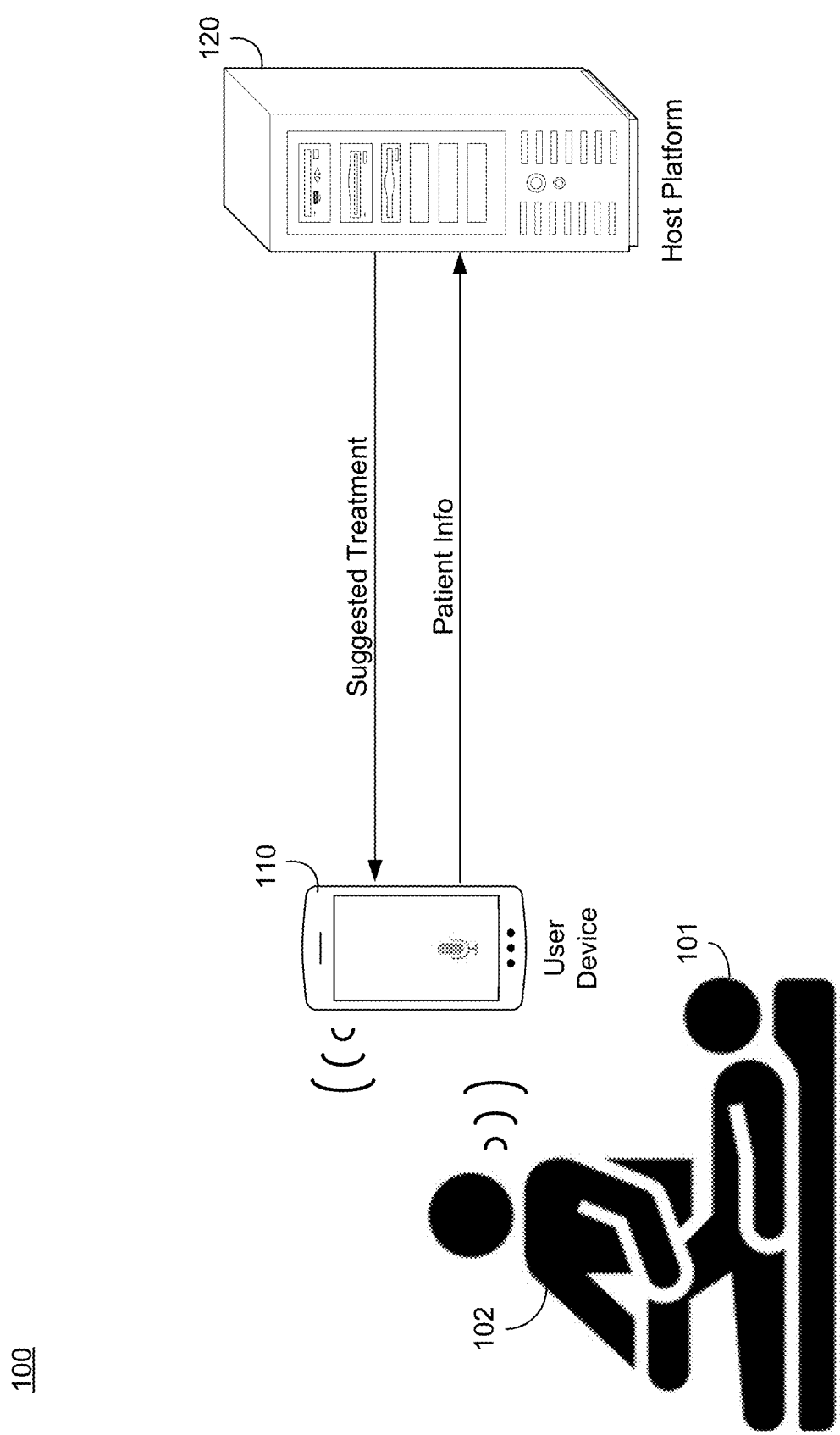
FIG. 1 is a diagram illustrating a computing environment for implementing a digital assistant for therapeutic treatment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments provide a digital therapy assistant (or virtual assistant) that verbally communicates with a physical therapist (or other user) to thereby improve the performance and tracking of therapeutic treatment. For example, the digital assistant may include a software program that recognizes treatment information from speech commands that are spoken by a physical therapist while performing treatment on a user thereby allowing the therapist to continue working on the user while documenting information about the treatment. The digital assistant may store the treatment information in a back-end host platform. Furthermore, the host platform may use machine learning to make suggestions on a treatment to be performed on the user in a next treatment session based on one or more previously performed treatments. In this case, the physical therapist may ask the digital assistant for a suggested treatment plan. In response, the digital assistant may output a speech response including the suggested treatment that is learned from the context of historical treatment information of the user recognized from previous speech inputs.

The digital assistant may communicate with a user (e.g., the therapist) in the form of a verbal/spoken conversation thereby relieving the therapist from having to stop providing treatment to input or write down notes. That is, the digital assistant enables a hands-free system that can document and even suggest treatment to be performed on another user such as an athlete or other patient. The digital assistant may be implemented via a system which includes a user device (mobile phone, tablet computer, smart-wearable, smart speaker, PC, etc.) associated with the therapist, and a host platform where data can be stored and machine learning can be performed. The user device and the host platform may communicate via a network such as the Internet.

In some embodiments, the user device may include a software program that implements the digital assistant and which communicates with a physical therapist using voice recognition and machine learning to identify treatment information, document the treatment information, and suggest treatments on future therapy sessions. The digital assistant makes treatment routines easier to handle for a physical therapist. The digital assistant may receive audio (speech) from the physio and store notes of the treatment being applied to the user (e.g., athlete, etc.) However, the speech being provided by the user may not be stored since this is health-sensitive data that is confidential patient information. The ensure sensitive data is not recorded, the digital assistant may be activated by a voice command that records only the therapist's speech and not the confidential information which may be given by the patient during treatment.

In various examples, two distinct usages of speech and speech recognition may be emphasized and treated in different ways. For example, to activate or start the treatment session with the digital assistant, the application may use the infrastructure provided by the operating system. The start command (e.g., start treatment) does not contain sensitive information and therefore can be processed by the operating system without revealing sensitive patient information to the operating system which is outside the control of the application. Once the treatment session is started, the rest of the voice data may be processed directly on the device and/or within boundaries of the back-end infrastructure of the host platform which is outside the control of the operating system.

A physical therapist may treat dozens of users on a regular basis. For example, a physio may perform planned treatments caused by an injury or preventive action. As another example, a physical therapist may apply daily ad-hoc treatments. One such ad-hoc scenario is a physical therapist for a sports team. Here, the therapist may provide treatment to players before/after each training session and each match to enhance player fitness. The digital assistant of the example embodiments enables a physical therapist to quickly document an ad-hoc treatment plan based on a combination of speech recognition and machine learning.

The digital assistant includes a speech recognition module that communicates with physio in the form of a conversation thereby enabling the physio to continue performing treatment while documenting the treatment of the player. For example, the physio may activate the digital assistant software using a voice command with intent. As a non-limiting example, the system may activate the assistant in response to one or more predetermined verbal commands (e.g., document new treatment, start new patient, request treatment, etc.). When documenting a treatment applied to a user, the physio may speak into the user device and communicate with the digital assistant to provide various details about the treatment such as the name of the user, the types of treatment, the amount of time, etc. The digital assistant may store this information along with a date and time extracted from the user device. Meanwhile, the host platform may store a treatment plan that is created with inferred data from the context of the verbal communication with the physical therapist. The host platform includes machine learning which learns which treatments were applied to the user previously, and proposes similar or the same treatments automatically during a next treatment session. Accordingly, the application may receive an input data from a therapist in a first step of a treatment scenario. Next, the application may perform machine learning on the input data and generate suggestions in the context of the started scenario in a second step.

FIG. 1 illustrates a computing environment 100 for implementing a digital assistant for therapeutic treatment in accordance with an example embodiment. Referring to the example of FIG. 1, the environment 100 includes a front-end which includes a therapist 102 providing treatment to a user 101. The therapist 102 may speak into a user device 110 which has running therein a digital assistant as described herein. Here, the therapist 102 and the user device 110 may be within ear shot of one another. In this case, the user device 110 may be a smartphone, a tablet, a laptop, a smart speaker, or the like. As another option, the user device 110 may be a smart-wearable device and/or a headset which can be worn by the therapist 102.

In this example, the user device 110 may recognize speech from the therapist 102 and may transmit the speech to a host platform 120 where the speech can be converted into text, and the host platform 120 can run machine learning on the text to identify treatment information such as the patient's name, a type of treatment being performed, a duration, and the like. In response, the host platform 120 may output speech data to be provided to the therapist 102 via the user device 110. For example, the speech data may include a speech response such as questions about the treatment, questions about the intent of the therapist 102, recommended treatments, and the like. In this way, the therapist 102 and the host platform 120 may communicate with one another via software programs implemented on the user device 110 (and the host platform 120).

For example, using a specific command (voice command) the physical therapist 102 may start the software application on the user device 102. The use of operating system (e.g., ANDROID®, iOS®, etc.) functionality of the user device 110 may start the software application. However, the operating system functionality may not be used for further speech recognition or processing because the audio could be revealed to the operating system. Instead, the software application may switch over functionality to the host platform 120 which performs the combination of speech-recognition and machine learning on the patient data such that the patient data is not exposed to the operating system. In other words, a switch of functionality between the operating system of the mobile device to a back-end host platform may occur to enable the host platform to perform speech-recognition, storage of treatments, and recommendations of future treatments.

In some examples, the physical therapist 102 only has to speak out the name of the user 101, and then the application asks the physical therapist 102 what treatment measures he/she would like to use. In response, the physical therapist may input a speech reply which identifies the type of treatment (e.g., massage, osteopathic, manual therapy, ice pack for muscle cramps, cool therapy, heat pad, etc.) and possibly the amount of time spent (10 minutes, 15 minutes, etc.). Furthermore, the host platform 120 may ask the therapist 102 if he wants to create a stored treatment for the player on that specific date. If an affirmative answer is received, the host platform 120 may store the treatment plan on a database. In some embodiments, the physical therapist 102 may only be able to record treatments for users they are previously registered or assigned to in the host platform. For example, the host platform may include a dictionary of users that the therapist 102 is allowed to store treatments for.

Meanwhile, the next time the physical therapist 102 treats the user 101, the host platform 120 may receive the name of the user 101 spoken by the therapist 102 via the user device 110, and automatically suggest a treatment to be performed via a speech output. In order to make recommendations, the host platform 120 may perform machine learning on treatment information of the user 101 previously provided by the therapist 102. Here, the speech recognition module may convert the spoken audio into text, and the host platform 120 may create a dialog with the end user (therapist 102, etc.). The proposed treatment is an audio spoken command by the application. The benefit here is that the physical therapist 102 does not have to write anything down but can document everything with words while they are giving the treatment. Furthermore, machine learning can identify a normal course of treatment from historical treatments, and then suggesting a treatment to be performed based on the normal course of treatment. The algorithm could also be more complex if needed. For example, the machine learning could be based on a time of day, whether the user/patient competed a match, had a run/jog, is warming-up, etc.

Figure 2A:
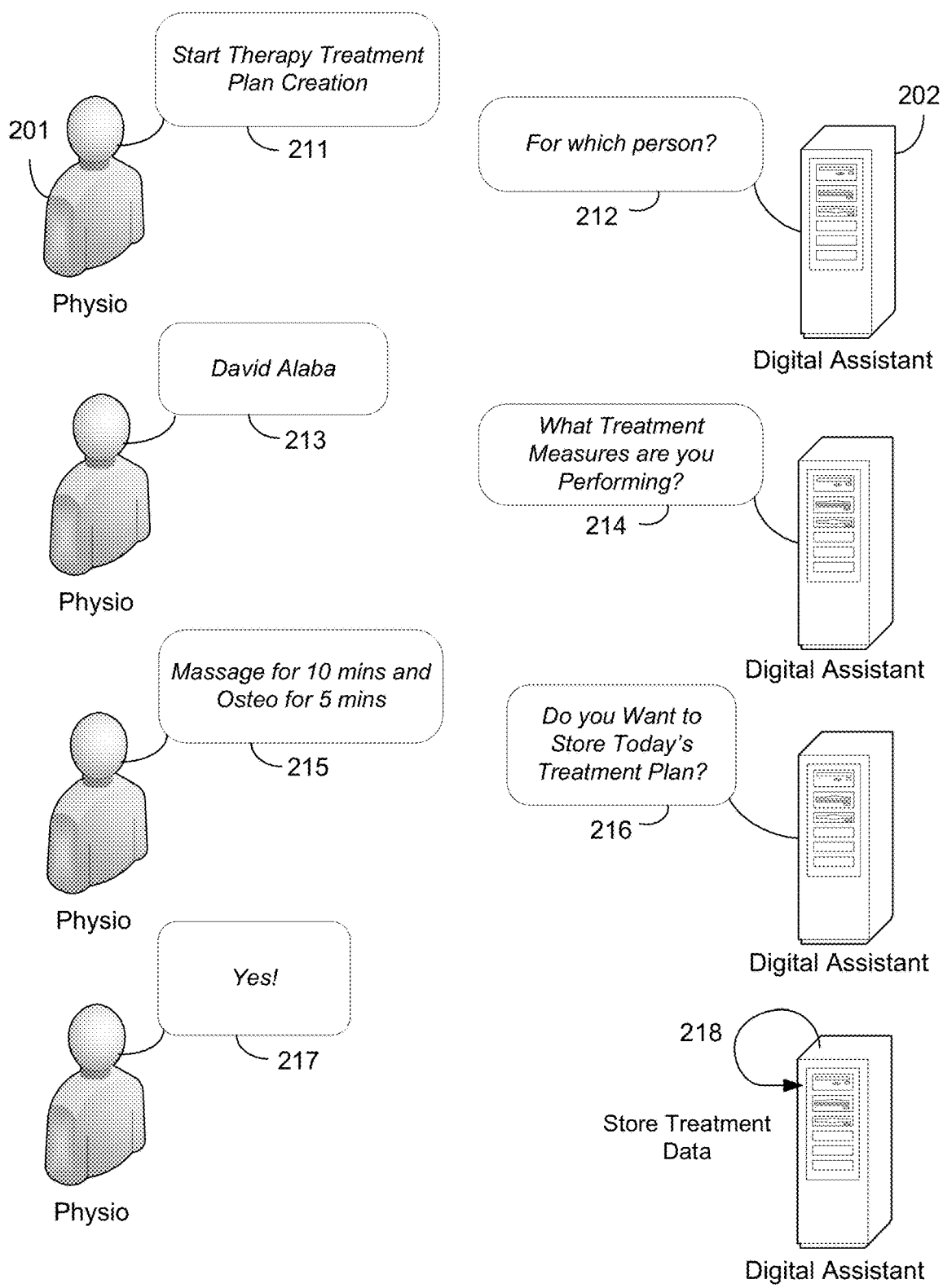
FIG. 2A is a diagram illustrating a process of communicating with a digital assistant in accordance with an example embodiment.
Figure 2B:
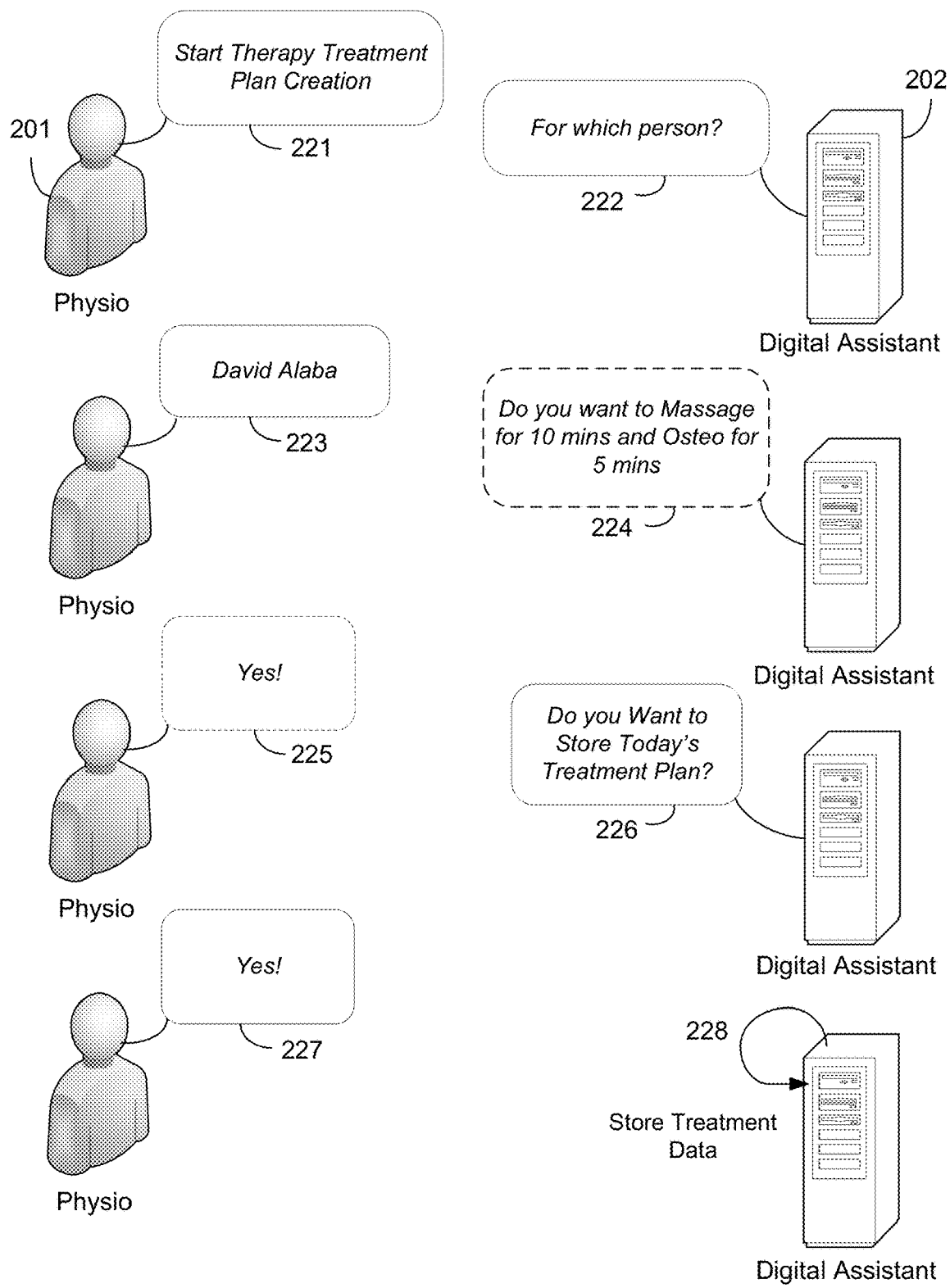
FIG. 2B is a diagram illustrating a process of receiving a suggested course of treatment from a digital assistant in accordance with an example embodiment.

FIG. 2A illustrates a process 200A of communicating with a digital assistant in accordance with an example embodiment, and FIG. 2B illustrates a process 200B of receiving a suggested course of treatment from a digital assistant 202 in accordance with an example embodiment. In the example of FIGS. 2A and 2B, a physio 201 communicates with the digital assistant 202. For example, the digital assistant 202 may be implemented via a combination of a host platform and a user device such as the host platform 120 and the user device 110 shown in the example of FIG. 1.

Referring to FIG. 2A, the physio 201 speaks to the digital assistant 202 to document a new course of treatment that is applied to a user/patient. In 211, the physio 201 activates the digital assistant 202 with an activation command (Start). In response, in 212, the digital assistant 202 asks which person the treatment is for. In 213, the physio 201 speaks a name of a person (e.g., David Alaba) for whom treatment is being given. In response, in 214, the digital assistant 214 asks the physio 202 what types of treatment are being performed. In response, in 215, the physio 201 provides two types of treatment (massage and osteo) and a duration of each. In response, the digital assistant 202 asks the physio 201 if they would like to store the treatment plan for future use, in 216. In response to receiving a yes from the physio 201, in 217, the digital assistant 202 stores the treatment for future use.

In order to perform the dialogue described in the example of FIG. 2A, the digital assistant 202 may perform machine learning on the speech being input by the physio 201. The machine learning may be used to identify responses from the physio such as keywords, treatment types, patient names, and the like.

Referring to FIG. 2B, the physio 201 receives a recommended treatment from the digital assistant 202 based on historical treatments provided to the user/patient. In 221, the physio 201 activates the digital assistant 202 with an activation command (Start). In response, in 222, the digital assistant 202 asks which person the treatment is for. In 223, the physio 201 speaks a name of a person (e.g., David Alaba) for whom treatment is to be provided. In this example, rather than asking the physio 201 if they would like to create a treatment plan, the digital assistant 202 determines that the user (i.e., David Alaba) has previous treatment information associated therewith.

According to various embodiments, in 224, the digital assistant 202 identifies the user based on the provided name, and determines a suggested course of treatment to be performed on the identified user (David Alaba) by the physio 201 based on historical treatment information associated with the identified user. The suggested treatment may be the same treatment that was most recently performed for the identified user. As another example, the machine learning may be more complex and identify different historical treatments for the identified user and suggest one of the different historical treatments based on one or more attributes of the current scenario such as time of day, date of the week, additional information (type of exercise performed, warm-up, cool-down, etc.). In 225, the physio 201 accepts the suggested treatment. Furthermore, the treatment can be stored in 226-228 similar to as performed in 216-218 of FIG. 2A.

Figure 3:
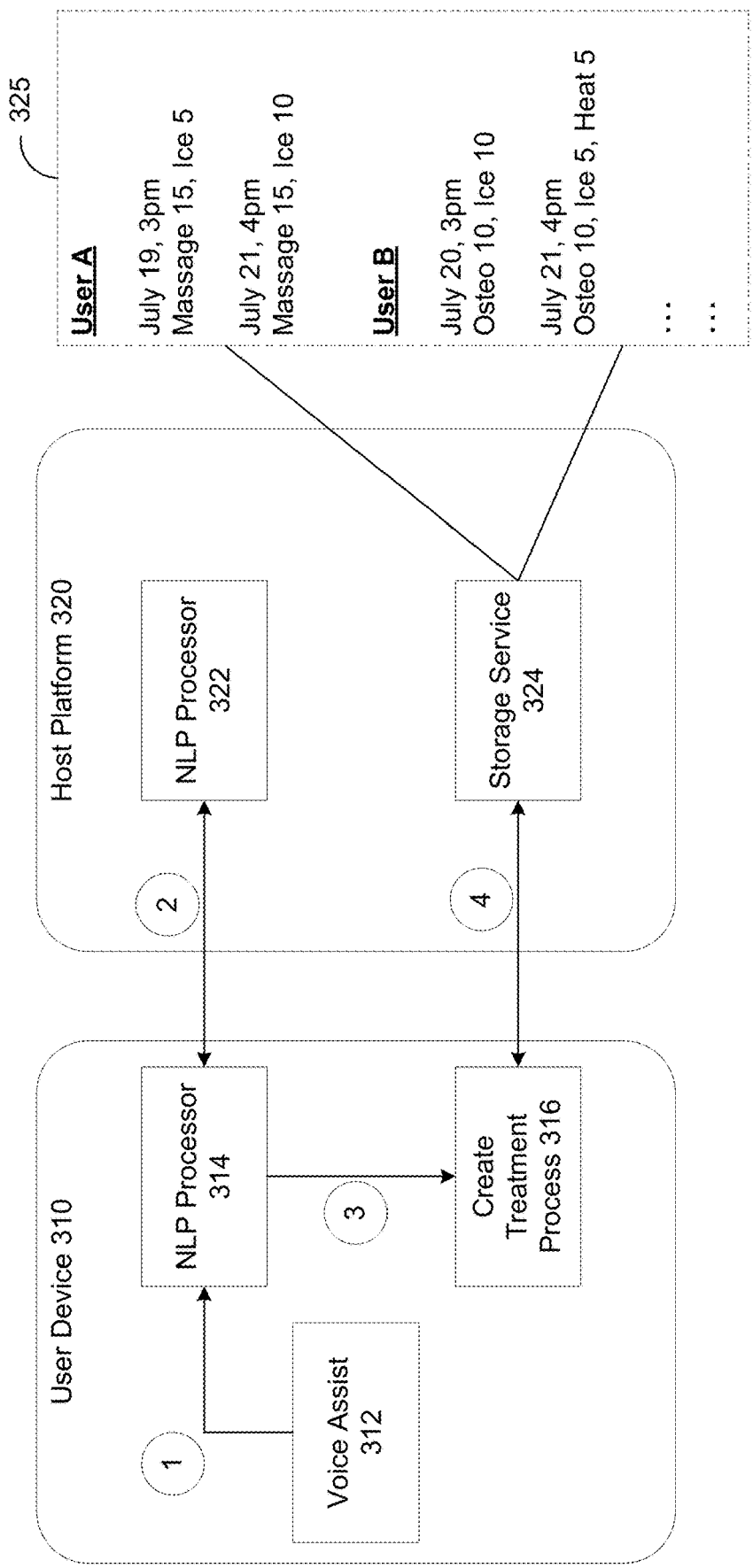
FIG. 3 is a diagram illustrating an architecture for implementing a digital assistant for therapeutic treatment in accordance with an example embodiment.

FIG. 3 illustrates an architecture 300 for implementing a digital assistant for therapeutic treatment in accordance with an example embodiment. Referring to FIG. 3, the architecture 300 includes a front-end which is represented by the user device 310 and a back-end which is represented by the host platform 320. The user device 310 may be a mobile phone, a tablet, a smart-wearable, etc. As another example, the user device 310 may be a personal computer, a smart speaker, an appliance, a television, and the like. Meanwhile, the host platform 320 may be a web server, a cloud storage, a database, an on-premises server, a user device, and the like.

In the example of FIG. 3, the host platform 320 may also include a dictionary 325 which stores a list of all users registered with a physical therapist associated with the user device 310. For example, the registration may occur at any time, during an initial sign-in, or the like. The dictionary 325 may also include historical treatment information such as types of therapy provided, durations, dates, times, and the like. If a user's first name and last name exists several times, the birth data may further be used to identify the user/patient. Meanwhile, if a user is not listed in the physio's dictionary 325, a treatment plan cannot be documented/stored in the dictionary 325.

Referring to the example of FIG. 3, a voice assist module 312 on the user device 310 may detect speech input. For example, the speech may request to create a new treatment plan for storage in the host platform 320. In response, the data needed for further processing may be collected by a natural language processor (NLP) module 314 which collects conversation audio and forwards it to an NLP module 322 on the host platform 320. For privacy/data protection reasons, speech-to-text conversation and machine learning may be handled by the NLP processor module 322 on the host platform 320. In response to a request from the user of the user device 310, the NLP processor module 324 may invoke a new treatment to be created and stored at the host platform 320. Here, the NLP processor module 324 may trigger the NLP processor module 314 which triggers the create treatment process 316 on the user device 310. The create treatment process 316 may identify a user name, a type of treatment, a duration, and the like, and transmit the treatment data to a storage service 324 in the host platform 320. Here, the storage service 324 may maintain the dictionary 325 including the newly created treatment data.

According to various embodiments, the digital assistant physical therapy application described herein may perform speech recognition and machine learning scenario for documenting treatment measures and providing recommended treatments. The results of the application provide significant savings of time to a physical therapist by enabling a machine to communicate with the physical therapist, identify treatment information to be document, and keep such treatment information for future use. Furthermore, the physio may document the treatment while performing the treatment enabling significant advantages in memory and time savings. When the physio performs a next treatment session, the digital assistant may auto-suggest a course of treatment based on treatment measures derived from the previous treatments and the physio only has to accept the proposal. Furthermore, the system enables data privacy regarding personal and sensitive data regarding the patient/user because the operating system of the user device 310 is only used to start the process and does not listen all the time. Therefore, personal and sensitive data is not transferred to any external servers but stays in the host platform's control.

Figure 4:
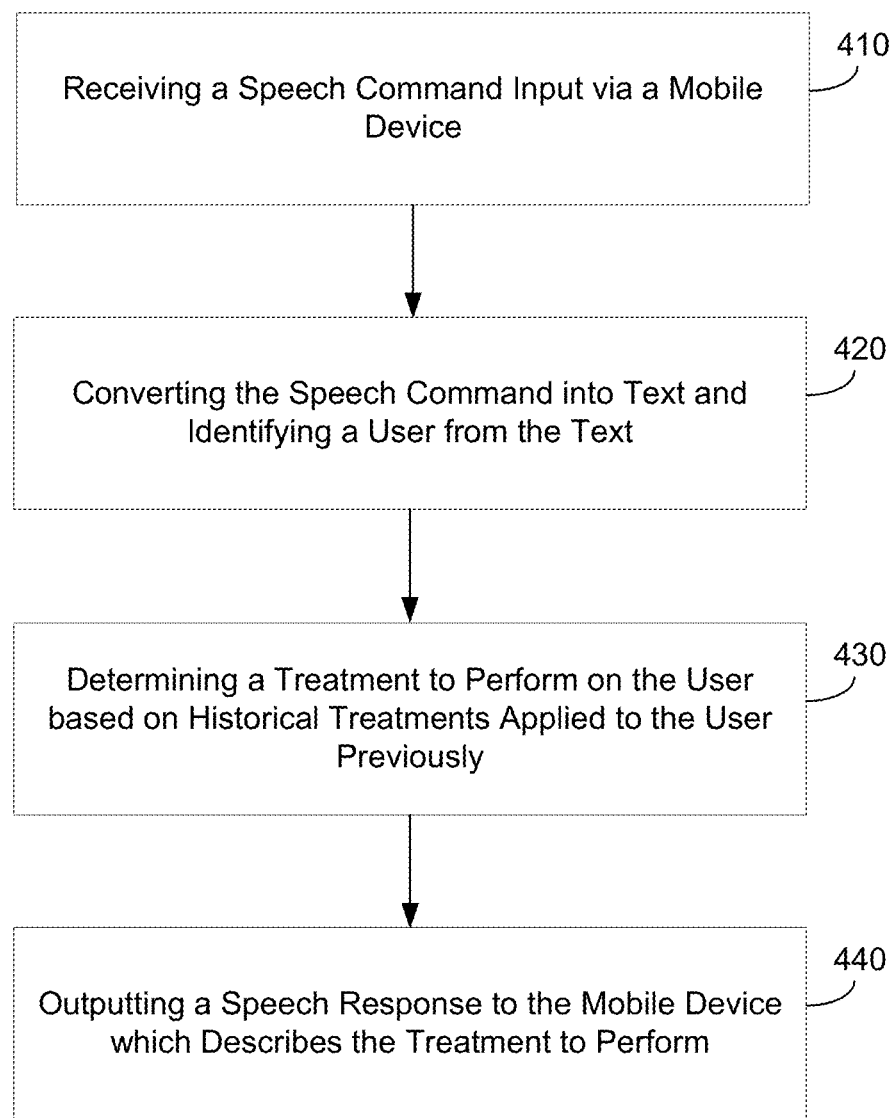
FIG. 4 is a diagram illustrating a method of a digital assistant recommending a course of treatment in accordance with an example embodiment.

FIG. 4 illustrates a method 400 of a digital assistant recommending a course of treatment in accordance with an example embodiment. The method 400 may be performed by a computing device such as a web server, a cloud platform, a user device, a kiosk, a television, and the like. Referring to FIG. 4, in 410, the method may include receiving a speech input command from a transmitting device. For example, the speech input command may be spoken by a physio who is working with a patient/user. The transmitting device may be a mobile device such as a smart phone, a tablet, a smart-wearable, etc. As another example, the transmitting device may be a personal computer, a smart speaker, or the like. The speech input command may be a request to start a new treatment session for the user.

In 420, the method may include converting the speech input command into text and identifying a user from among a plurality of users based on the text converted from the speech input command. Here, the plurality of users may be stored in a database, and each user may have different historical treatment information associated with their historical therapy sessions. The platform may identify a user from among the words included in the text converted from the input speech, and identify previous treatments associated with the identified user.

In 430, the method may include determining a treatment to be performed for the identified user based on historical treatments given to the identified user stored in a database. In some embodiments, the determining may include determining the treatment to be performed based on historical treatment information included in speech input commands previously received for the identified user from the transmitting device. For example, the treatment may be determined based on machine learning of previous treatments. In the most basic example, the platform may suggest the same treatment that was performed the day before (or most recently). As a more complex example, the platform may recommend a type and duration of treatment based on a time of day, whether the person played in a game or a practice, and the like. Accordingly, different attributes of the current situation/day may be used to identify a suggested course of treatment when there are different historical treatments stored in the database.

In 440, the method may include outputting, to the transmitting device, a speech response describing the determined treatment to be performed on the identified user. Here, the speech response may include text that is transmitted from the host platform to the transmitting device which then converts the text into the spoken speech response that is output to the physical therapist. In some embodiments, the speech response may include a spoken description of a type of physical therapy to be applied to the identified user. In some embodiments, the speech response may further include a spoken description of how long to perform the type of physical therapy. In some embodiments, the outputting the speech response may be performed in response to verifying that the identified user is approved for treatment by a therapist associated with the transmitting device.

In some embodiments, the method may further include receiving treatment speech input from the transmitting device which comprises a description of treatment performed with respect to the identified user. The treatment speech may include a description from the therapist of the type of treatment they are performing, a duration, a name of the person who is receiving the treatment, and the like. In this example, the method may further include converting the received treatment speech into text and storing the text of the received treatment speech within the historical treatments stored in the database. For example, the stored text comprises a user name of the identified user receiving the treatment, a type of treatment, and a duration of the treatment.

Figure 5:
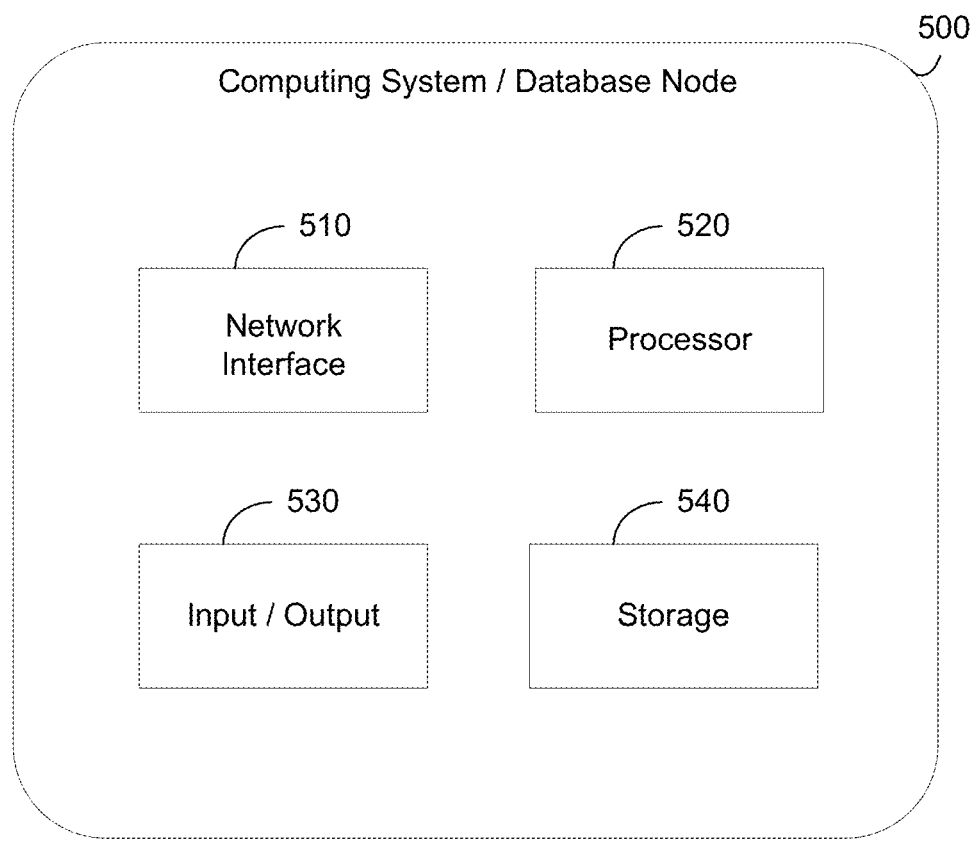
FIG. 5 is a diagram illustrating a computing system that can be used herein in accordance with any of the example embodiments.

FIG. 5 illustrates a computing system 500 that can be used in any of the example embodiments described herein. For example, the computing system 500 may be a web server, a database, a cloud platform, a user device, a server, or the like. In some embodiments, the computing system 500 may be distributed across multiple devices. Referring to FIG. 5, the computing system 500 includes a network interface 510, a processor 520, an input/output 530, and a storage device 540 such as a memory. Although not shown in FIG. 5, the computing system 500 may also include or be electronically connected to other components such as a display which may include an embedded display panel, an externally connected monitor, a network connection device having a display, etc., an input unit, a receiver, a transmitter, and the like. The processor 520 may control or replace any of the components shown in the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may be a port, a cable, a connector, etc., that can be used to input and output data to and from the computing system 500. The storage device 540 is not limited to a particular storage device and may include any known memory device such as RAM, ROM, hard disk, and the like. The storage 540 may store software modules or other instructions which can be executed by the processor 520 to perform the methods herein.

According to various embodiments, the network interface 510 may receive a speech input command from a transmitting device. For example, the speech input command may be a request to activate a treatment plan, a name of a person to be treated, and the like. The processor 520 may convert the speech input command into text, for example, using a speech-to-text converter. The processor 520 may identify a user from among a plurality of users based on the text converted from the speech input command, and determine a treatment to be performed for the identified user based on historical treatments given to the identified user stored in a database. According to various embodiments, the processor 520 may determine the treatment to be performed based on machine learning of historical treatment information included in speech input commands previously received for the identified user from the transmitting device.

Furthermore, the processor 520 may control the network interface 510 to output, to the transmitting device, a speech response describing the determined treatment to be performed on the identified user. For example, the output speech response may include a spoken description of a type of physical therapy to be applied to the identified user, a spoken description of how long to perform the type of physical therapy, and the like.

In this example, the computing system 500 receives speech from the transmitting device which is then converted by the processor 520 into text. However, in other examples, the speech may already be converted to text when provided to the computing system, that is, when it is received by the network interface 510. Likewise, the computing system 500 may transmit the speech response in the form of an audio file to the transmitting device. As another example, the computing system 500 may transmit the speech response as text to the transmitting device, and the transmitting device may convert the text to speech (audio) which is then output to the therapist via the transmitting device.

In some embodiments, the processor 520 may receive treatment speech input from the transmitting device which comprises a description of treatment performed with respect to the identified user. The treatment speech may include a description of treatment (type, duration, name of user, etc.) being given. In this example, the processor 520 may convert the received treatment speech into text and store the text of the received treatment speech within the historical treatments stored in the database. For example, the stored text may include a user name of the identified user receiving the treatment, a type of treatment, and a duration of the treatment. In some embodiments, the processor 520 may output the speech response, only in response to verifying that the identified user is approved for treatment by a therapist associated with the transmitting device. In other words, certain users may be pre-registered with the therapist and the therapist may only be allowed to create treatment plans for approved users.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network channel.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals and may be referred to as non-transitory.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a network interface configured to receive a speech input command from a transmitting device; and
a processor configured to convert the speech input command into text, identify a user from among a plurality of users based on the text converted from the speech input command, and determine a treatment to be performed for the identified user via execution of a machine learning algorithm which determines the treatment to be performed based on historical treatments of the identified user stored in a database, wherein the machine learning algorithm further determines the treatment to be performed for the identified user based on one or more contextual attributes about an activity performed by the user which is received as an input by the machine learning algorithm,
wherein the processor is further configured to control the network interface to output, to the transmitting device, an audio response verbally describing the determined treatment to be performed on the identified user.

2. The computing system of claim 1, wherein the audio response comprises a spoken description of a type of physical therapy to be applied to the identified user.

3. The computing system of claim 2, wherein the audio response further comprises a spoken description of how long to perform the type of physical therapy.

4. The computing system of claim 1, wherein the processor is configured to determine the treatment to be performed via execution of the machine learning algorithm based on historical treatment information included in speech input commands previously received for the identified user.

5. The computing system of claim 1, wherein the processor is further configured to receive treatment speech input from the transmitting device which comprises a description of treatment performed with respect to the identified user.

6. The computing system of claim 5, wherein the processor is further configured to convert the received treatment speech into text and store the text of the received treatment speech within the historical treatments stored in the database in response to a second speech input command from the transmitting device.

7. The computing system of claim 1, wherein the processor is configured to output the audio response, in response to verifying that the identified user is approved for treatment by a therapist associated with the transmitting device.

8. A method comprising:
receiving a speech input command from a transmitting device;
converting the speech input command into text and identifying a user from among a plurality of users based on the text converted from the speech input command;
determining a treatment to be performed for the identified user via execution of a machine learning algorithm which determines the treatment to be performed based on historical treatments of the identified user stored in a database, wherein the machine learning algorithm further determines the treatment to be performed for the identified user based on one or more contextual attributes about an activity performed by the user which is received as an input by the machine learning algorithm; and
outputting, to the transmitting device, an audio response verbally describing the determined treatment to be performed on the identified user.

9. The method of claim 8, wherein the audio response comprises a spoken description of a type of physical therapy to be applied to the identified user.

10. The method of claim 9, wherein the audio response further comprises a spoken description of how long to perform the type of physical therapy.

11. The method of claim 8, wherein the determining comprises determining the treatment to be performed via execution of the machine learning algorithm based on historical treatment information included in speech input commands previously received for the identified user.

12. The method of claim 8, further comprising receiving treatment speech input from the transmitting device which comprises a description of treatment performed with respect to the identified user.

13. The method of claim 12, further comprising converting the received treatment speech into text and storing the text of the received treatment speech within the historical treatments stored in the database in response to a second speech input command from the transmitting device.

14. The method of claim 8, wherein the outputting the audio response is performed in response to verifying that the identified user is approved for treatment by a therapist associated with the transmitting device.

15. A non-transitory computer readable medium comprising program instructions which when executed cause a computer to perform a method comprising:
  receiving a speech input command from a transmitting device;
  converting the speech input command into text and identifying a user from among a plurality of users based on the text converted from the speech input command;
  determining a treatment to be performed for the identified user via execution of a machine learning algorithm which determines the treatment to be performed based on historical treatments of the identified user stored in a database, wherein the machine learning algorithm further determines the treatment to be performed for the identified user based on one or more contextual attributes about an activity performed by the user which is received as an input by the machine learning algorithm; and
  outputting, to the transmitting device, an audio response verbally describing the determined treatment to be performed on the identified user.

16. The non-transitory computer readable medium of claim 15, wherein the audio response comprises a spoken description of a type of physical therapy to be applied to the identified user.

17. The non-transitory computer readable medium of claim 16, wherein the audio response further comprises a spoken description of how long to perform the type of physical therapy.

18. The non-transitory computer readable medium of claim 15, wherein the determining comprises determining the treatment to be performed via execution of the machine learning algorithm based on historical treatment information included in speech input commands previously received for the identified user.

19. The computing system of claim 1, wherein the machine learning algorithm further determines the treatment to be performed for the identified user based on a time of day at which the speech input command occurs which is received as an input by the machine learning algorithm.

* * * * *